US008986079B2

(12) United States Patent
Remmer et al.

(10) Patent No.: US 8,986,079 B2
(45) Date of Patent: Mar. 24, 2015

(54) PICKING ROW FOR A POULTRY DEFEATHERING APPARATUS AND SUCH AN APPARATUS

(75) Inventors: Michael Remmer, Trige (DK); Ole Bach, Trige (DK); Poul Kjeldsen, Trige (DK); Uffe Thrane, Trige (DK)

(73) Assignee: Linco Food Systems A/S, Trige (DK)

( * ) Notice: Subject to any disclaimer, the term of this patent is extended or adjusted under 35 U.S.C. 154(b) by 0 days.

(21) Appl. No.: 14/128,981

(22) PCT Filed: Jun. 24, 2011

(86) PCT No.: PCT/DK2011/050237
§ 371 (c)(1),
(2), (4) Date: Mar. 31, 2014

(87) PCT Pub. No.: WO2012/175083
PCT Pub. Date: Dec. 27, 2012

(65) Prior Publication Data
US 2014/0213163 A1    Jul. 31, 2014

(51) Int. Cl.
A22C 21/00    (2006.01)
A22C 21/02    (2006.01)

(52) U.S. Cl.
CPC .................................. A22C 21/022 (2013.01)
USPC ........................................................ 452/86

(58) Field of Classification Search
USPC ............... 452/63, 75, 76, 173, 82–86, 87–93
See application file for complete search history.

(56) References Cited

U.S. PATENT DOCUMENTS

| 3,483,589 A * | 12/1969 | Smorenburg | 452/91 |
|---|---|---|---|
| 3,596,309 A * | 8/1971 | Vertegaal | 452/89 |
| 3,713,352 A | 1/1973 | Crane | |
| 3,969,790 A * | 7/1976 | Smorenburg | 452/75 |
| 4,217,678 A * | 8/1980 | Crawford et al. | 452/91 |
| 4,329,760 A * | 5/1982 | van Mil | 452/91 |
| 4,514,879 A * | 5/1985 | Hazenbroek | 452/91 |
| 5,106,333 A * | 4/1992 | Van Dorn et al. | 452/91 |
| 5,853,320 A * | 12/1998 | Wathes et al. | 452/88 |
| 7,648,412 B2 * | 1/2010 | Kjeldsen | 452/88 |

FOREIGN PATENT DOCUMENTS

| GB | 1 437 370 A | 5/1976 |
|---|---|---|
| GB | 2 284 141 A | 5/1995 |

OTHER PUBLICATIONS

International Search Report for PCT/DK2011/050237, dated Mar. 6, 2012.

* cited by examiner

Primary Examiner — Richard Price, Jr.
(74) Attorney, Agent, or Firm — Sughrue Mion, PLLC

(57) ABSTRACT

The invention relates to a poultry defeathering apparatus and to a picking row for use in such an apparatus. The picking row comprises an elongate support part with a front side surface, a back side surface, a two interconnecting side surfaces interconnecting the front and back side surfaces. Said side surfaces extends in parallel to a length axis of the support part and a plurality of picking heads are arranged on the front side surface. At least one of the interconnecting side surfaces is convex, preferably being curved with a radius of curvature corresponding to half the height of the support part. In the apparatus, two or more picking rows are arranged side-by-side with the picking heads facing in substantially the same direction such that interconnecting side surfaces of neighboring picking rows face each other. In such a pair of interconnecting surfaces, at least one of them is convex.

19 Claims, 9 Drawing Sheets

US 8,986,079 B2

PICKING ROW FOR A POULTRY DEFEATHERING APPARATUS AND SUCH AN APPARATUS

CROSS REFERENCE TO RELATED APPLICATIONS

This application is a National Stage of International Application No. PCT/DK2011/050237, filed Jun. 24, 2011, the contents of all of which are incorporated herein by reference in their entirety.

BACKGROUND OF THE INVENTION

1. Field of the Invention

The present invention relates to a picking row for use in a poultry defeathering apparatus, said picking row comprising: an elongate support part with a front side surface, a back side surface facing away from the front side surface, a first interconnecting side surface and a second interconnecting side surface, said side surfaces extending in parallel to a length axis of the support part and said first and second interconnecting side surfaces interconnecting the front and back side surfaces; a plurality of picking heads arranged on the front side surface of the support part, each comprising a disc shaped base member a plurality of picking fingers attached thereto; and at least one actuator for rotating each of the picking heads about an axis, which is substantially perpendicular to the length axis of the support part. The invention further relates to a poultry defeathering apparatus including such picking rows.

2. Background

Poultry defeathering apparatuses of this type and the picking rows there fore are known for example from WO2007/071236A1, WO2005/072323A2 and CN2755995Y.

As explained in WO2005/072323 the positioning of the picking rows in relation to each other has great influence on the defeathering operation and hence on the risk of damaging the carcass, when the picking fingers impinge on and move across its surface. If the picking fingers interact too heavily with the carcass the result can be downgraded quality and loss of yield. On the other hand, it is important to obtain carcasses that have been fully defeathered, also when the line speed is high.

To allow an optimum positioning of the picking rows they are often designed with beveled edges, which allow them to be positioned relatively closely to each other in mutually angled positions as shown in CN2755995Y. A space is always kept between the picking rows to avoid the generation of noise during use and this space is closed with sheet members keeping feathers inside the defeathering zone of the apparatus and away from motors and other moveable parts.

The sheet members, however, tend to become scratched, which makes them difficult to clean, and hence they have to be replaced regularly.

It is therefore the object of the invention to provide a picking row and a defeathering apparatus, where the sealing between the picking rows is achieved in an alternative way, which requires less maintenance.

SUMMARY OF THE INVENTION

This is achieved with a picking row, where at least one of the interconnecting side surfaces is convex, and with a poultry defeathering apparatus where picking rows are arranged side-by-side such that their respective length axes are substantially parallel to each other and at a distance from each other and with the picking heads facing in substantially the same direction, so that interconnecting side surfaces of neighbouring picking rows face each other thereby forming a pair of interconnecting side surfaces, where at least one of the interconnecting side surfaces forming a pair is convex.

The convex surface allows the picking rows to be arranged closely against each other and still be repositioned if necessary, the convex surface simply rolling on the opposite surface, if/when they come into direct contact. This effect is of course particularly pronounced when both of the interconnecting side surfaces of a contacting pair are convex.

In this respect it is noted that the term "convex" is intended to cover curved surfaces, which may be composed of several sections having different radii of curvature or a combination of curved and straight sections, and including surfaces composed of three or more straight sections together forming a curved basic form. For example the interconnecting section may be provided with a toothed surface resembling that of a gear wheel as long as the overall shape is curved. Such a toothed surface will provide a particularly good sealing between the neighbouring picking rows when the teeth engage and allow movement of one to be transmitted to the other, but will not be as easy to keep clean as a smooth surface. Moreover, a smooth surface will give a smooth movement of the picking rows, when rolling over each other, and allow one of them to be shifted without moving the other.

Likewise it is to be understood that the front and back side surfaces may meet with the interconnecting side surfaces either at an edge or in a smooth transition and that the front and/or back side surface may also be curved. A support part made from a pipe with a circular or elliptical cross-sectional shape is this also part of the invention.

The cross-sectional shape presently preferred has straight front and back side surfaces, which are parallel to each other and perpendicular to the axes of rotation of the picking heads, while both interconnecting surfaces are curved with a radius of curvature corresponding to half the height of the support part. The height is here defined as the longest distance between the interconnecting surfaces measured perpendicularly to the length axis and to the axes of rotation of the picking heads, i.e. in parallel to the front and back side surfaces.

Advantageously, the width of the support part is then equal to or larger than the radius of curvature of the interconnecting surfaces, the width being defined as the longest distance between the front and back side surfaces measured in parallel to the axes of rotation of the picking heads. This gives room for housing the actuator(s) within the support part and, when keeping the width equal to or only slightly larger than the radius of curvature of the interconnecting surfaces, the base members of the pickings heads can be kept within the circumscribed circle of the cross-section of the support part.

Picking rows intended for use in defeathering chicken or other birds of similar size advantageously has a height of the support part of 100-300 mm, preferably 250-150 mm, more preferred 200 mm and the base members of the picking heads advantageously have a diameter of 100-300 mm, preferably 110-180 mm, more preferred 135 mm.

The centre distance between the picking rows will of course depend on the height and cross-sectional shape of the support parts, but when the height is 200 mm and the shape as described above, a distance of 202 mm has been found to work well.

In order to allow the picking rows to be angled in respect to each other it is preferred that they further comprise mounting pins or holes at their ends at their cross-sectional centroid or centre of gravity. These can then be interconnected to an apparatus frame, so that the picking row becomes pivotable about an axis, which is parallel to its length axis and preferably intersects the cross-sectional centroid or centre of gravity of the support part.

It is noted, that the picking rows can be in constant direct contact over their entire length but that this need not be the case as long as they are sufficiently close to each other to prevent feathers from penetrating between them and escaping the defeathering zone. In fact, a small gap between the picking rows, at least when the apparatus is not in operation, is considered advantageous as it will then be possible to clean the joint between them without having to move them away from each other. In an apparatus for use in processing chicken carcasses a gap of 0 to 5 mm may for example be employed, typically 1 to 3 mm.

Contact between the picking rows has hitherto been considered inappropriate, since it would result in unacceptable noise levels during the defeathering operation, particularly when the picking rows are made from stainless steel, which is the material traditionally used. This problem may, however, be eliminated by making at least one of the interconnecting side surfaces of a pair of neighbouring picking rows from a non-metallic material. The close proximity of the picking rows prevents feathers from escaping the apparatus and the non-metal side surface muffles the sound whenever direct contact occurs.

The non-metallic material is preferably chosen from the group consisting of: plastic, such as nylon, ceramics, fibre glass, carbon fibres and any composites and mixtures thereof. Two surfaces, which are intended to be in contact with each other, may be made from materials with different hardness, thus achieving a self-lubricating effect, and that one is worn before the other, thus concentrating maintenance on one of the picking rows.

The picking rows may be made with their final shape, for example by moulding, or the convex shape of the interconnecting side surface may be formed by an attachment member attached directly or indirectly to a base member of the support part either permanently or detachably. A surface of a non-metallic material may be provided in a similar manner.

For the sake of simplicity and ease of maintenance it is preferred that two or more picking rows in an apparatus according to the invention are identical. When all rows are identical the risk of a malfunctioning picking row being replaced with a wrong type is eliminated and only one type of picking row has to be manufactured and kept on stock.

The number of picking heads, which a carcass has to pass to be properly defeathered depends on a number of factors, including the type of picking heads used and the speed with which the carcass is moved along the picking rows. In many cases is will necessary for each section of the carcass to pass twenty or more picking heads. A picking row including that many picking heads is, however, difficult to make and operate satisfactorily and it may therefore be advantageous to use shorter picking rows and arrange two or more of them end-to-end. This may be done by connecting two picking rows to each other to form one longer picking row, by mounting them in a single apparatus frame or by arranging more apparatus units in a row.

As also known from prior art defeathering apparatuses it is preferred to have two or more picking rows arranged opposite each other with the picking heads of each picking row facing the other. This allows the carcass to be defeathered on both sides at the same time and the two-sided picking prevents the carcass from swinging away from the picking heads.

Each picking row is preferably equipped with its own driving mechanism, preferably an electric motor.

Since the picking rows in the apparatus according to the invention is sitting much closer to each other than the those in prior art apparatuses, there is an increased risk of the motors getting in the way of each other when the picking rows are displace and/or tilted in relation to each other. It is therefore preferred that the motors are arranged at a distance from each other seen in the direction of the length axes of the picking rows. This may be achieved by mounting picking rows, where the motor is mounted at a distance from the centre of the picking row side-by-side with every other row is inverted so that the motors of neighbouring rows come to be located at opposite ends. Preferably, the motor of each picking row is mounted at a picking head, the axis of rotation of which forms the first or second point of intersection counted from the centre of the picking row along its length axis. This provides a good balance between the overall weight balance of the individual picking row as well as the apparatus as a whole, the distribution of forces and the need for room for the motor. It is, however, to be understood that the motors could also be arranged closer to the middle of the picking row, shifted only enough to prevent neighbouring motors colliding, or closer to the end and that the distance need not be the same on all rows. The most appropriate position will also depend on factors such as the overall length of the picking row and on the number picking heads.

BRIEF DESCRIPTION OF THE DRAWINGS

In the following the invention will be described in closer detail with reference to the drawing, where.

DETAILED DESCRIPTION OF THE INVENTION

Figure 1:
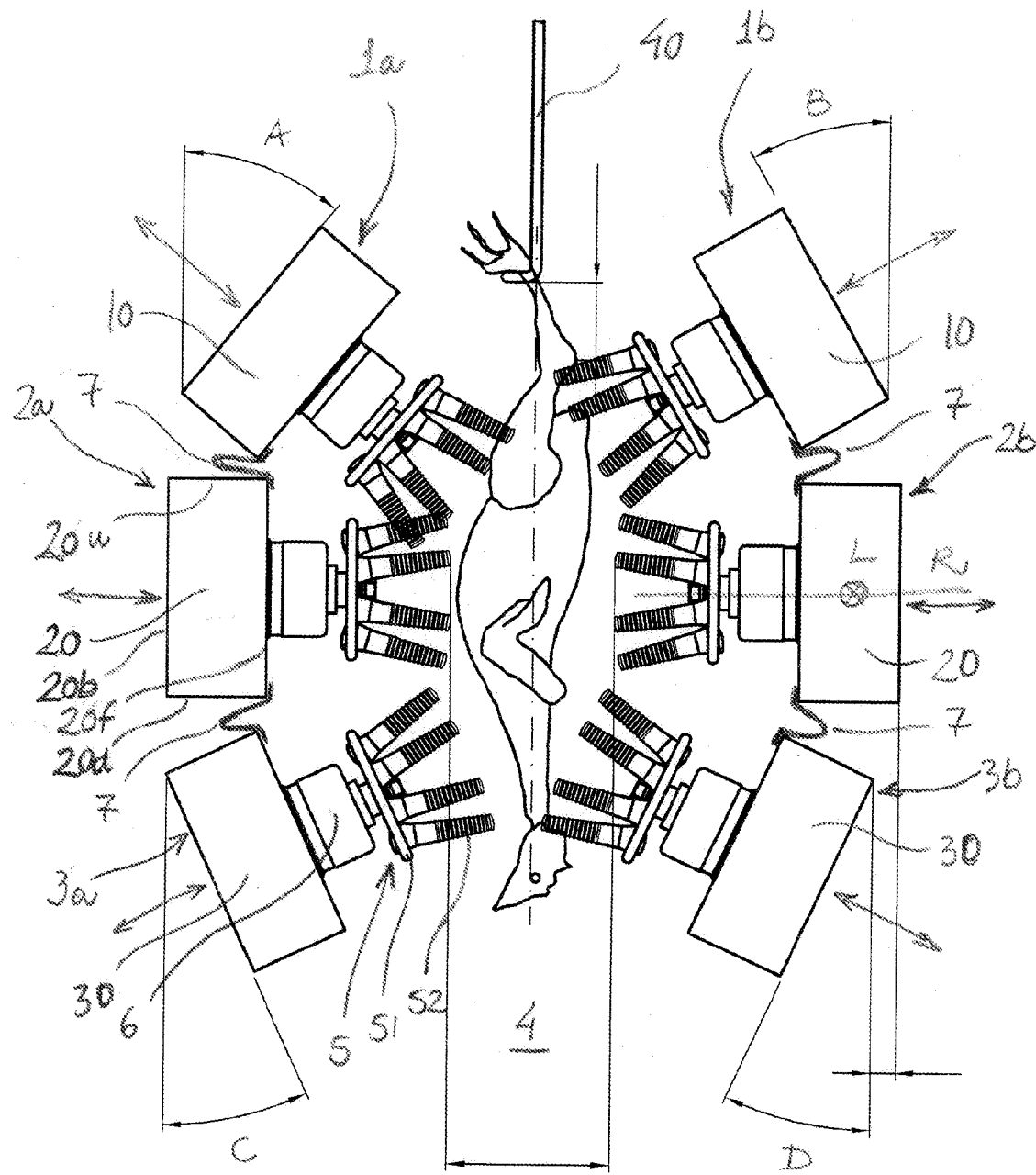
FIG. 1 shows parts of a prior art defeathering apparatus during operation in an end view.

Six picking rows 1a, 1b, 2a, 2b, 3a, 3b of a prior art poultry defeathering apparatus defining a defeathering zone 4 are shown in FIG. 1, where they are used for picking the feathers off a chicken carcass, which is hanging from a shackle 40 by its legs. Each picking row comprises a support part 10, 20, 30, which, for the sake of simplicity shown only on the middle left picking row in FIG. 1, has a front side surface 20f, a back side surface 20b facing away from the front side surface, a first upwards facing interconnecting side surface 20u and a second downwards facing interconnecting side surface 20d. It is noted, that the terms "upwards" and "downwards" refer only to a general orientation and only to the apparatus shown on the drawing. As an example the interconnecting side surfaces of pickings rows 1a are not facing directly upwards and downwards and the apparatus as a whole may be build with a different orientation of the picking rows. Unless otherwise stated, similar considerations apply to any other indications of direction given herein.

Picking heads 5 are arranged on the front side surfaces 20*f* of all rows and it is to be understood that each picking head shown represents a plurality of picking heads distributed along the elongate support part, which extends with its length axis L into the plane of the drawing. Each picking head 5 comprises a disc shaped base member 51 a plurality of picking fingers 52 attached thereto, for example as described in WO2007/071236A1. Inside each of the support parts 10, 20, 30 and projecting through a respective opening (not visible) therein is an actuator 6 for rotating each of the picking heads 5 about an axis R. The actuators may in principle be any mechanism capable of rotation the picking heads, but a series of gears as will be well known to the skilled person is preferred.

In FIG. 1, for the sake of simplicity, the length axis L of the support part and the axis of rotation R are only shown on the middle picking row to the right, but it is to be understood that such axes are found on all picking rows. Likewise, some of the reference numbers are applied only to one of the six picking rows, but it is to be understood that they are identical except for their spatial orientation and hence all include all of the different features described above with reference to FIG. 1.

As may be seen in FIG. 1 the six picking rows 1*a*, 1*b*, 2*a*, 2*b*, 3*a*, 3*b* defining the defeathering zone 4 are arranged three on each side of the chicken carcass, thus effectively forming a tunnel, which the carcass is passed through by advancing the shackle 40 on a conveyor (not shown). The middle picking rows 2*a*, 2*b* are arranged with their axes of rotation R substantially horizontal, whereas the upper and lower picking rows 1*a*, 1*b*, 3*a*, 3*b* on each side are inclined with the picking heads towards the centre of the defeathering zone as represented by angles A, B, C and D in order to make the shape of the defeathering zone conform to the shape of the carcass. These angles may be changed in order to adapt to difference in the size and breed of the birds, the later having influence on the shape of the carcass, and the picking rows may further be moved in and out as indicated by the double arrows.

The prior art picking rows are arranged at a distance from each other for allowing a mutual movement and angling and for preventing direct contact, which has been known to result in the generation of noise. The gaps thus existing between the picking rows are covered by sealing sheets 7 to prevent feathers from escaping the defeathering zone 4.

In the following description of the invention like reference numerals are used to denote like structures for the picking rows and picking heads as in FIG. 1, but with 100, 200 and 300 added, respectively.

Figure 2:
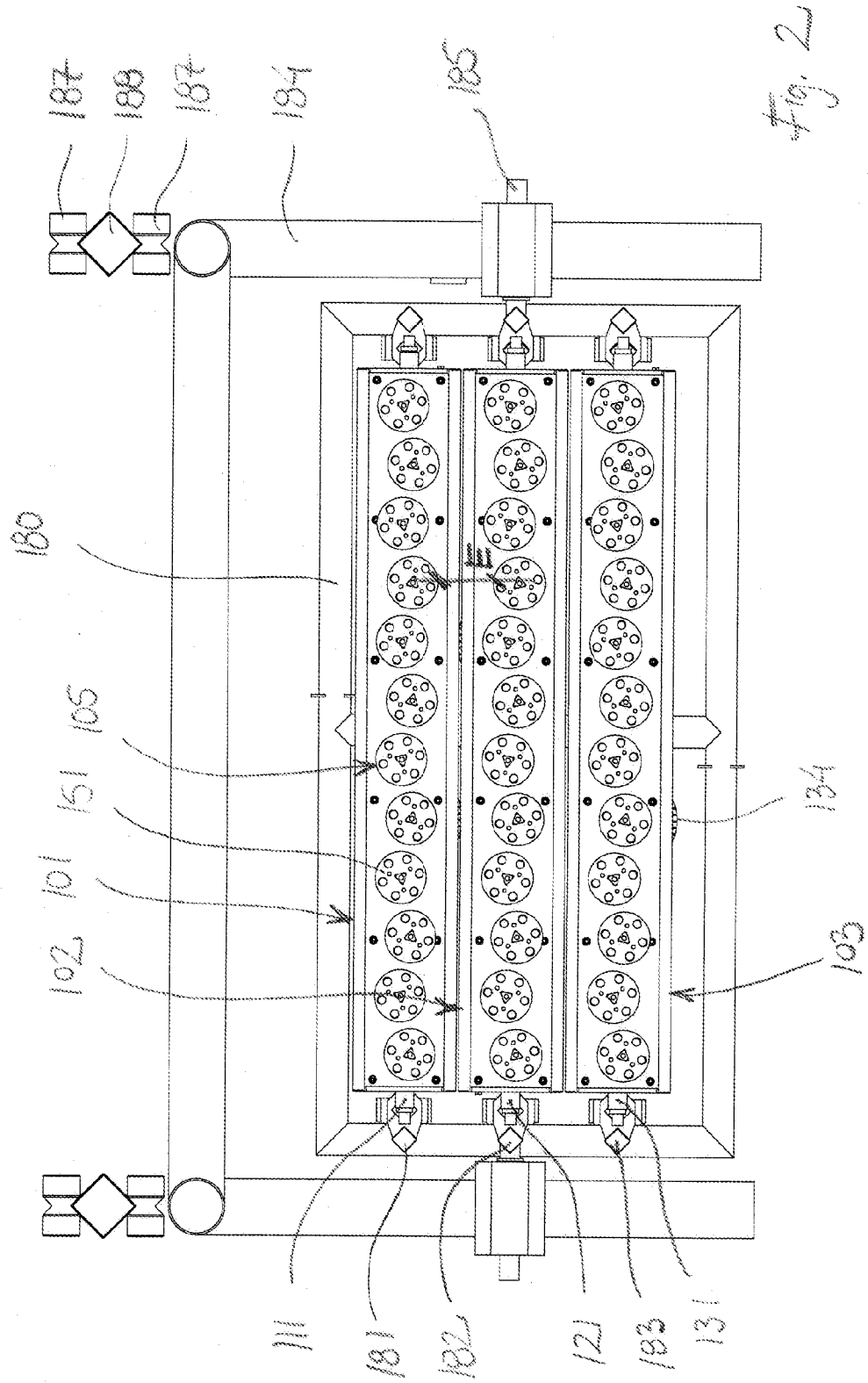
FIG. 2 shows an apparatus according to the invention in a front view.
Figure 3:
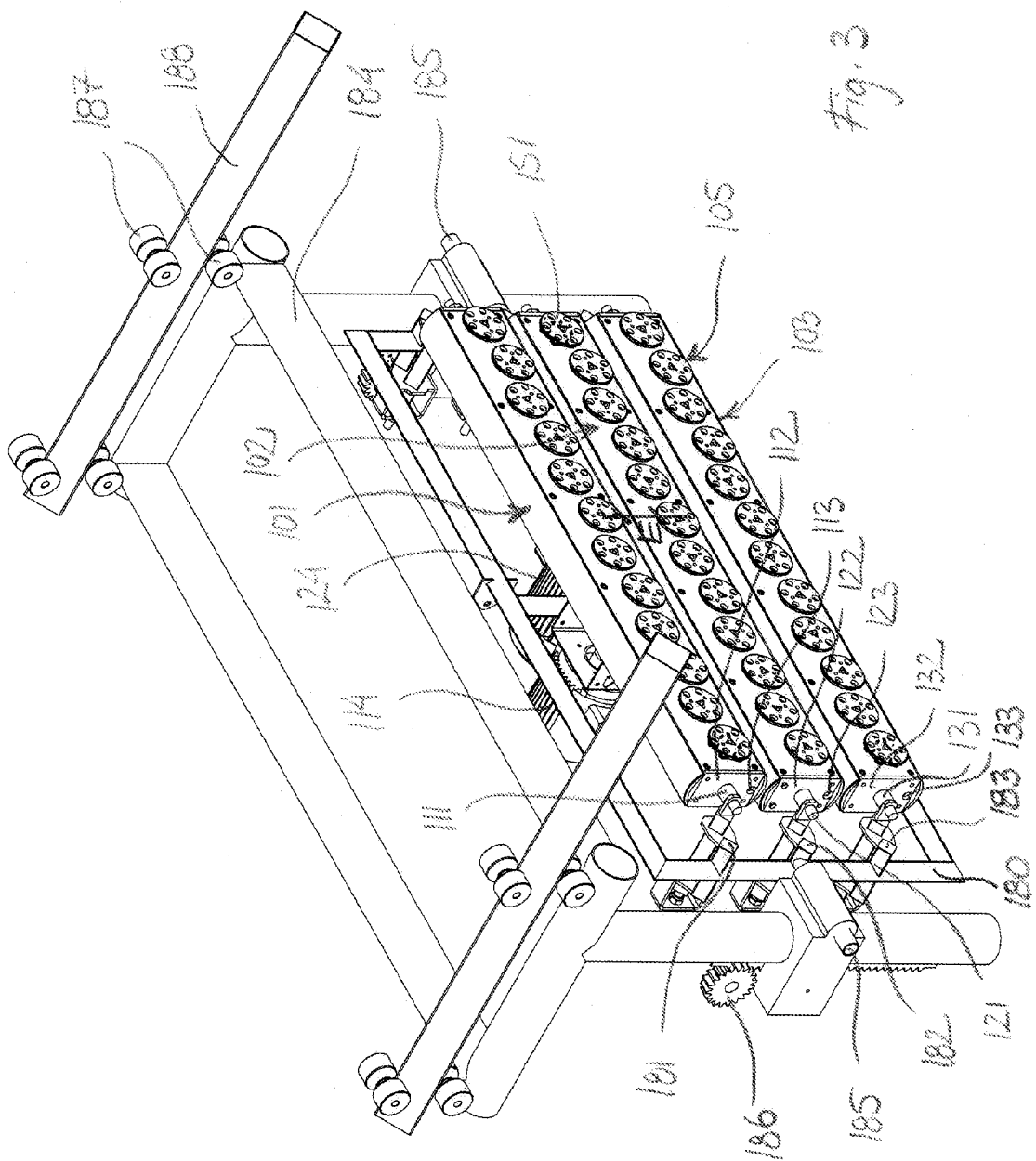
FIG. 3 shows the apparatus in FIG. 2 in a perspective view.

Referring now to FIGS. 2 and 3 a poultry defeathering apparatus according to the present invention is shown. This defeathering apparatus too comprises three picking rows 101, 102, 103 arranged above each other, but here only one such set of is shown. The apparatus may in principle be used in this configuration, but it is preferred that a corresponding though mirror inverted second set of picking rows are provided just as in FIG. 1, since a double sided picking will prevent the carcass from swinging away from the picking heads 105 during operation. This also applies to other embodiments of the invention described below.

The picking rows in FIGS. 2 and 3 are each provided with twelve picking heads 105 arranged in a zigzag pattern, but they could also be arranged along a straight line as has traditionally been the case. For the sake of simplicity the picking heads are shown without picking fingers, represented only by the base members 151.

Each picking row 101, 102, 103 is attached to the apparatus via a pin 111, 121, 131 projecting from end surfaces 112, 122, 132 of the picking rows and inserted into respective holes in fittings 181, 182, 183 on a picking frame 180. In this embodiment, the pin connection simply allows the picking row to swing about the pin axis under the influence of external forces, such as the contact between the picking fingers and the carcass. It is, however, preferred to provide means for actively swinging one or more of the picking rows, for example by attaching push/pull rods (not shown) to the holes 113, 123, 133 in the ends surfaces 112, 122, 132 of the respective picking rows.

The picking frame 180 is attached to an apparatus frame 184 via pin connections 185 potentially allowing it to swing and its position can be adjusted in by means of a height adjustment mechanism 186 and by rolling the apparatus frame 184 on wheels 187 along rails 188. In this embodiment the rails 188 are hung either from the ceiling or a larger frame (not shown), but it is also possible provide rails at the floor or to use a wheeled apparatus frame running directly on a floor without rails.

Each picking row is provided with an electric motor 114, 124, 134 for driving the picking heads 105. The motors may be battery driven or receive power via a cable (not shown), which may be wholly or partially integrated in the apparatus frame 184. Other driving mechanisms are of course also possible including hydraulics and so is the use of a single motor for all three picking rows. Combustion engines are, however, less preferred due to the exhausts.

As may be seen, the motors of the uppermost 101 and lowermost 103 picking rows are located somewhat to the left of the centre of the picking row, namely behind the fifth of the twelve picking heads counted from the left. The motor on the intermediate picking row 102 is located behind the eighth of the twelve picking head, i.e. somewhat to the right of the centre of the picking row. This is to give space for each motor, thus not only allowing a swinging of the individual picking rows without the motors colliding, but also preventing overheating and giving space for maintenance and repair. Moreover, the displaced positions of the motors also contribute to balancing the apparatus as a whole both with regards to weight and with regards to vibration. The motors may in principle be arranged anywhere between the centre and the respective end of the picking row, but to make sure that the force generated by the motor is distributed substantially evenly on all picking heads, it is preferred that they are arranged at picking heads located one or two positions away from the centre.

The motors shown on the drawing are low-energy motors, which are relatively small compared to the motors traditionally used, and it will thus be understood that the problems with regards to space may be even more pronounced than what is illustrated here.

Figure 4:
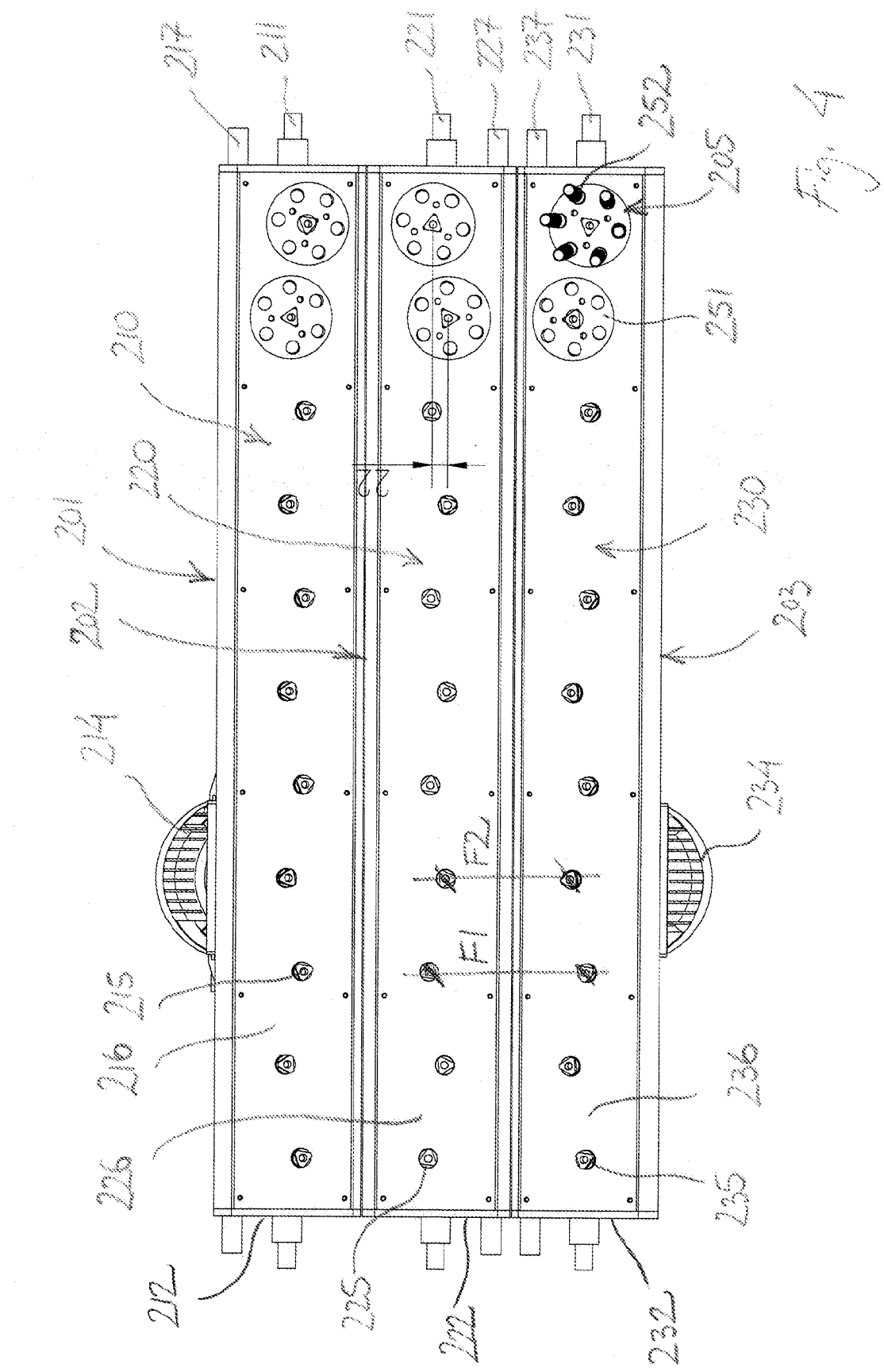
FIG. 4 shows three picking rows arranged side-by-side in a front view.
Figure 5:
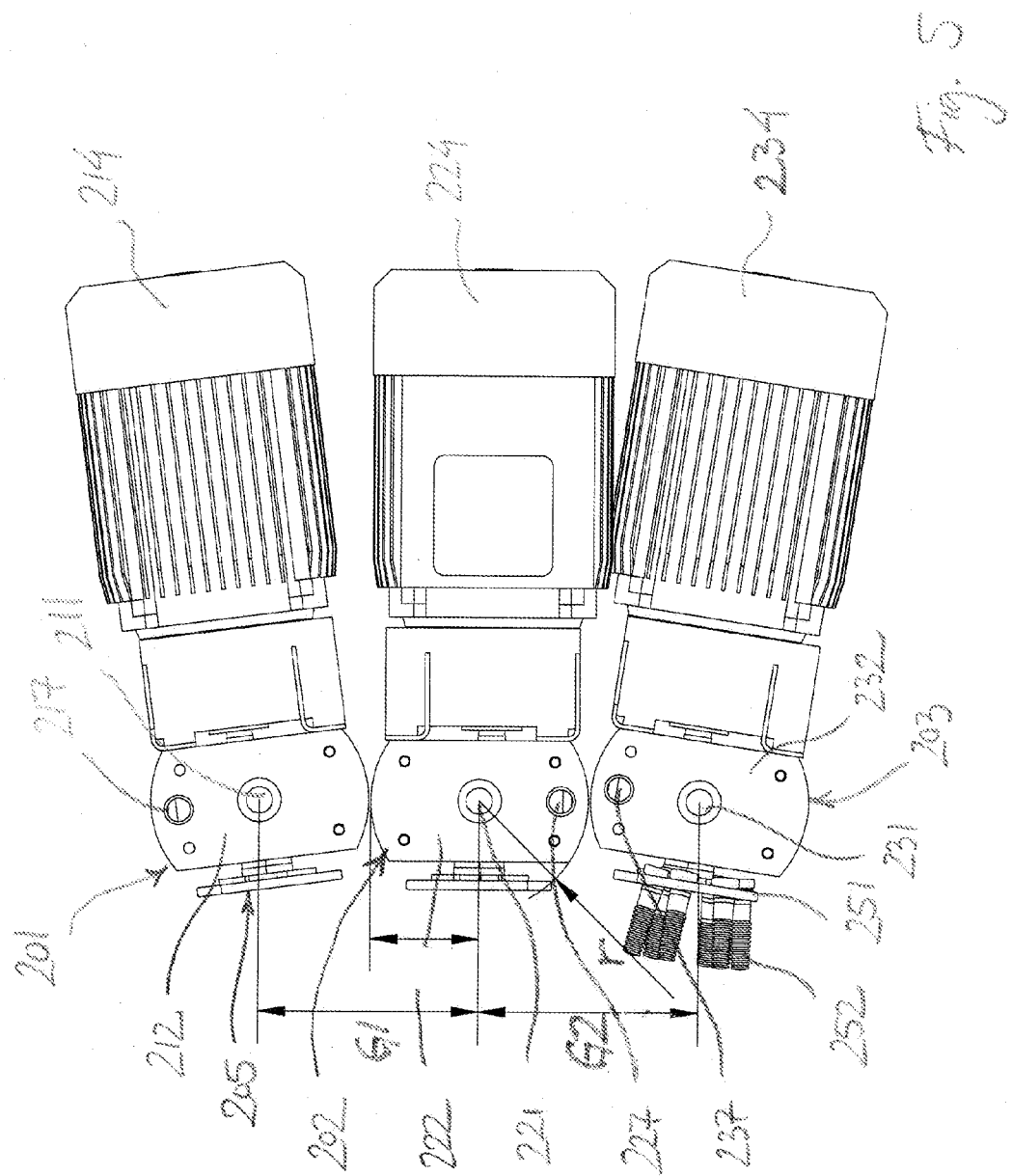
FIG. 5 shows the picking rows in FIG. 4 in an end view.
Figure 6:
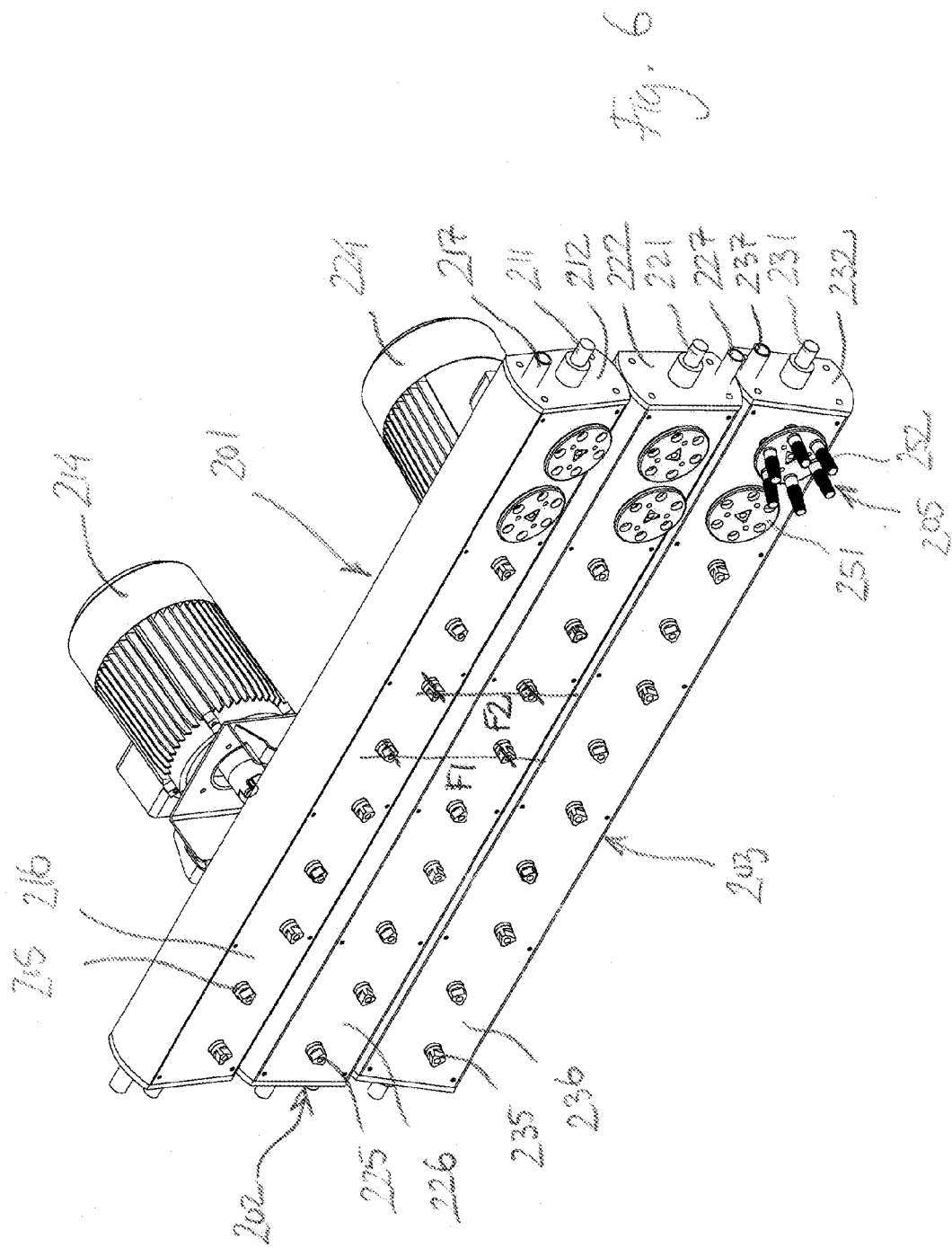
FIG. 6 shows the picking rows in FIGS. 4 and 5 in a perspective view.

FIGS. 4, 5 and 6 show another embodiment of picking rows 201, 202, 203 according to the invention, each with eleven picking heads 205. Here, for the sake of simplicity, only two picking heads are shown on each picking row and only one is shown with picking fingers 252. The positions of the remaining picking heads are illustrated by the intersection between their axis of rotation 215, 225, 235 and the side surface 216, 226, 236 of the picking row.

The picking rows in FIGS. 4, 5 and 6 are identical and the mutual displacement of the motors 214, 224, 234, which may be seen in FIGS. 4 and 6 has been achieved by simply inverting the intermediate picking row 202. This may also be seen from the position of the pins 217, 227, 237, which serve the same function as the holes 111, 121, 131 in the end surfaces of the picking rows in FIGS. 2 and 3. If such an inversion of the pins and/or holes used for interconnection to the frame (not shown in FIGS. 4-6) is for some reason not desired, the support part 210, 220, 230 can be made with detachable end plates constituting the end surfaces 212, 222, 232. These may then simply be detached and inverted when inverting the picking row in question. Such end plates may be attached for example by means of screws or with a snaplock as a click-on unit. Detachable end plates will allow the addition of other functionalities as will described later and will also provide access to the interior of the support part for inspection or maintenance.

Another, though less versatile alternative, is to provide a series of threaded holes in the end surfaces thus allowing the addition and removal of pins etc. according to demands.

When using picking rows with an odd number of picking heads as in FIGS. 4, 5 and 6 is also possible to used mirrored front plates and back plates on every second row in the apparatus. When using picking rows with an even number of picking heads, the picking rows can be entirely identical.

The use of identical picking rows mean that a defective picking row may be replaced by any other picking row, that only one type has to be kept in stock and that the risk of wrongful mounting is reduced.

Figure 7:
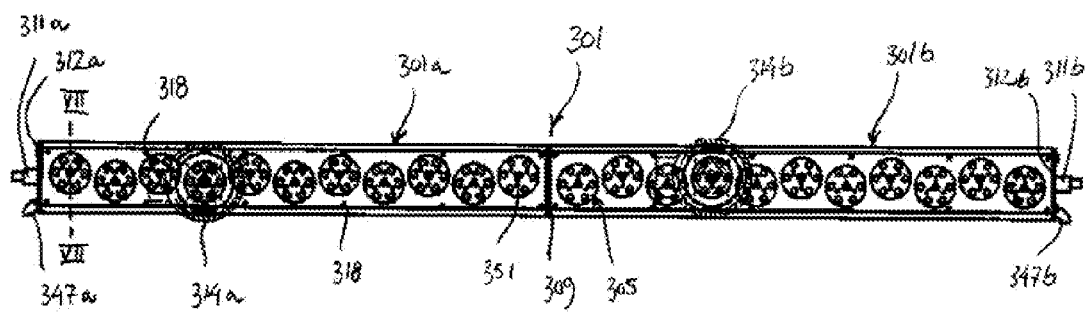
FIG. 7 shows two picking rows arranged end-to-end in a front view.

A third embodiment of a picking row 301 according to the invention is shown in FIG. 7. This picking row is assembled from two smaller picking rows 301a and 301b, which have been connected at end surfaces. Each of the smaller picking rows 301a, 301b has eleven picking heads 305 and the pattern of the picking heads on the right picking row 301b is inverted in relation to the pattern on the left picking row 301a, so that together they create a continuous zigzag pattern.

The interconnection has here be achieved by removing standard end plates as those described with relation to the embodiment in FIGS. 4-6 and inserting a connector 309, which interconnects the two smaller picking rows 301a and 301b.

In addition to the pins 311a, 311b for interconnection to the picking frame 180, the end plates 312a, 312b are here provided with drain pipes 347a, 347b for allowing water and any other fluids possibly penetrating into the support part during cleaning to escape.

Each of the smaller picking rows 301a, 301b has its own motor 314a, 314b, both of which are located at the fourth picking head counted from the left, but it is to be understood that the two motors could also be located differently from each other.

Figure 8:
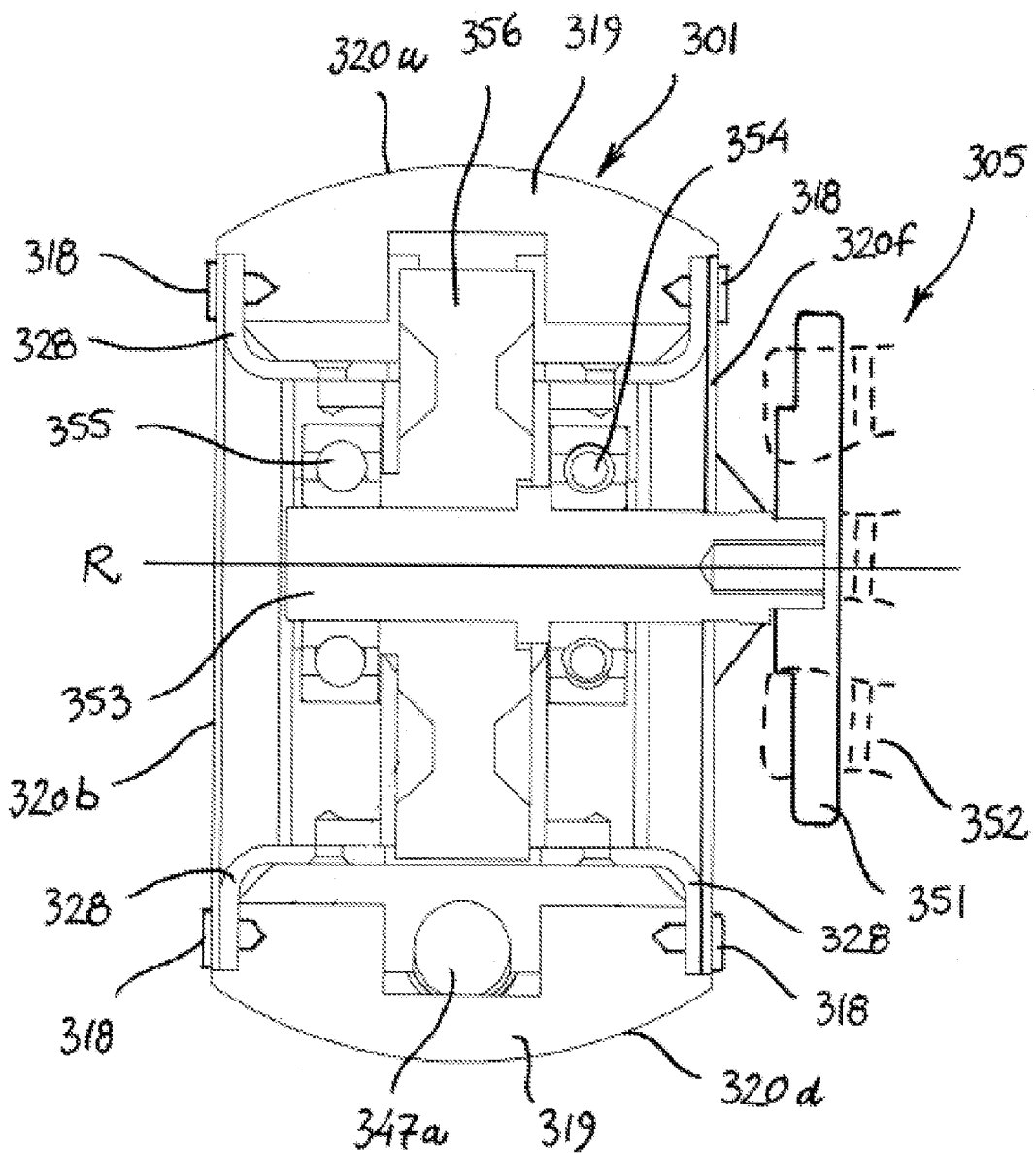
FIG. 8 shows the picking row in FIG. 7 in a cross-sectional view.

A cross-sectional view of the picking row 301 along the line VII-VII in FIG. 7 is shown in FIG. 8. Here too the picking head 305 is represented by the base member 351, only the innermost end of the fingers being indicated in broken lines 352. The base member 351 is attached to an axle 353 the centre of which constitutes the axis of rotation R. The axle project through a plate 320f, which constitutes the front side surface of the support part, and is kept in place by circular bearings 354, 355 inside the support part. A gear wheel 356 is mounted on the axle between the bearings and interconnected to a similar gear wheel (not shown) on a neighbouring picking head axle. All picking heads in the picking row is provided with such gear wheels and when one is set in motion by means of the motor 314, all gear wheels are forced to move. The direction of rotation is thus opposite on neighbouring picking heads, as will be well known to the skilled person. In the embodiment shown, the axis of rotation R is located somewhat above the centre of the support part, since the picking head 305 shown is one of those located high in the zigzag pattern shown on FIG. 7, but if using picking heads arranged on a straight line, the axis will usually be located approximately at the centre.

The front side surface 320f and the back side surface 320b are constituted by plates, which are attached by means of screws 318. The screws penetrate into profile members 319 constituting first and second interconnecting side surfaces 320u, 320d facing upwards and downwards, respectively. Interposed between the plates and the profile members are stiffening members 328 in the form of U-shaped profiles arranged with their legs projecting on each side of the profile members.

The stiffening members 328 preferably extends over the entire length of the support part 310, but may also be local and present only at sections, where particular stiffness or strength is needed, for example at the ends and at the motor. It is also possible to have both a through-going and local stiffening members and/or to reinforce a through-going stiffening member, for example by increased thickness, in selected sections.

In the embodiment shown in FIG. 8, the profile members 319 may be said to constitute an attachment member, which is attached directly to the support part in a semi-permanent manner by the screws. It is also possible to use an easily releasable way of attachment thus enabling easy replacement for maintenance or for giving the interconnecting side surface a different shape. In this case is may be expedient to provide a socket member for providing an indirect attachment. Alternatively, a permanent attachment can be achieved by embedment in a moulding material or by gluing.

Preferably, the plates constituting the front side surface 320f and the back side surface 320b are made from stainless steel, the stiffening members 328 from aluminium and the profile members 319 from plastic.

Figure 9:
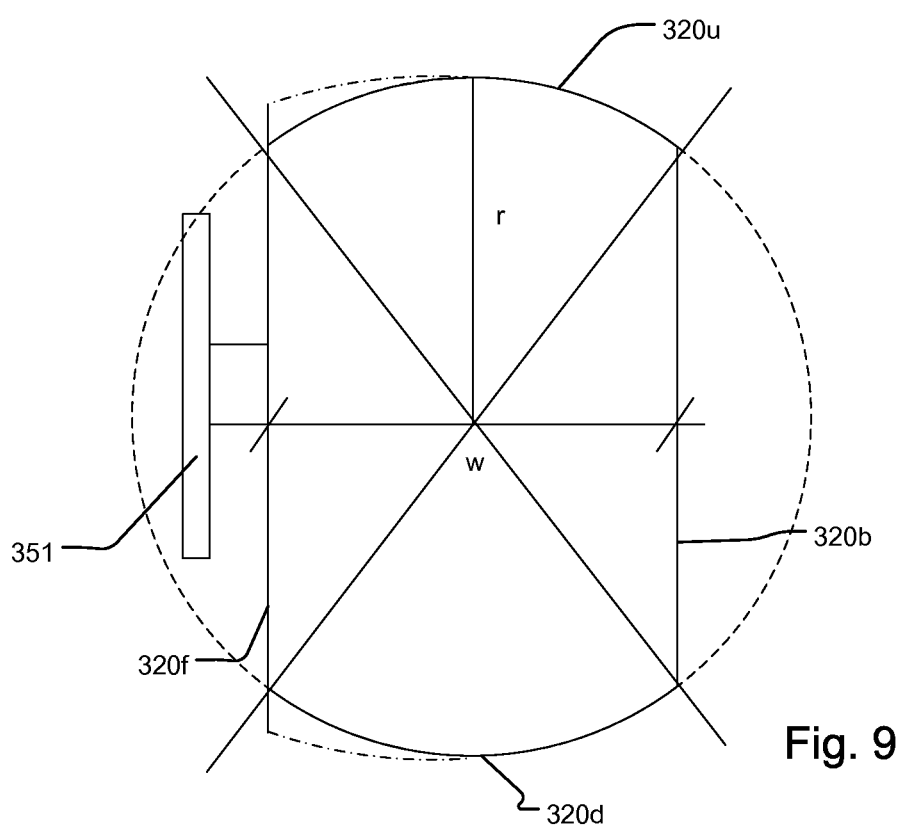
FIG. 9 shows the cross-sectional shape of the picking row in FIG. 8 in closer detail.

The cross-sectional shape of the picking row in FIG. 8 is shown in closer detail in FIG. 9. As may be seen, both of the interconnecting surfaces 320u, 320d are convex with the shape of a sector of a circle and have the same radius of curvature r so that the centroid of the picking row is also the centre of a circumscribed circle as indicated in broken line in FIG. 9. The front and back side surfaces are parallel and the distance between them, i.e. the width W of the support part, is here slightly larger than the radius of curvature of the interconnecting surfaces.

Curved surfaces like this means that two picking rows may be arranged close to each as shown in FIGS. 2-6 and still be angled in relation to each other, the interconnecting surfaces of the two picking rows facing each other simply "rolling" over each other. It is noted that there need not be a direct contact between the two picking rows, as will be explained later, but that a mutual angling movement will resemble such a rolling motion even if a small gap is present between the picking rows.

The interconnecting surfaces having the shape of a sector of a circle means that the distance between the picking rows remain the same during a rolling motion caused by a chance of angle of one or both picking rows and that the risk of collision is thus minimised. Other shapes may, however, be preferred. If, for example, the radius of curvature was made larger on the part of the interconnecting side surface closest to the front side surface 320f as indicated by dash-dot-line in FIG. 9, this would set a limit to the mutual angling of two neighbouring picking rows. Cf. for example the angling between picking rows 1b and 2b indicated by the angle B in FIG. 1. Likewise, a convex surface composed of several straight sections would result in the rolling movement being divided up into a corresponding number of steps, which might serve as an indication of the progress of the mutual movement. A given movement might then be described as the number of steps the picking row is moved.

In order to achieve an optimal picking of a carcass, it is often not sufficient to angle the picking row in relation the each other. The picking rows are also shifted as illustrated by the double arrows in FIG. 1, though not necessarily in the exact direction shown as there will often be provided for independent horizontal or vertical movement. This may result in a change of the distance G1, G2 between the centroids of the picking rows as indicated in FIG. 5 and so also between their interconnecting side surfaces, depending also on the geometrical shape of these. To avoid collision between the picking rows, the outermost picking rows of a series, illustrated by 201 and 203 in FIG. 5, may then be moved in a direction having a vertical component away from the other picking rows, here illustrated by the middle picking row 202. Another option is to provide a small gap between them, at least in certain positions, to give room for such movement and this may of course be used in combination with the vertical movement.

Having a small gap between the picking rows has the advantage that vibration during operation will not cause the picking rows to hit against each other, which may result in the generation of noise, when the interconnecting surfaces of the picking rows are made from stainless steel or other metals. The gap should, however, not be larger than approximately 5 mm as the sealing effect will otherwise be lost, such a gap preferably being in the interval of 1 to 3 mm.

As an example, take a series of picking rows embodied as in FIGS. 2-7 with interconnecting side surfaces having the shape of a sector of a circle with its centre in the centroid of the picking row as illustrated in FIG. 9 and where the axis of rotation of the picking row as defined by the pins 111, 121, 131, 211, 221, 231, 311a, 311b is coinciding with the centre of the circle. Here, a 202 mm distance G1, G2 between the centres has been found to be working very well for a radius of curvature r of 100 mm.

The width of the support part shown in FIG. 9 provides the picking row with a sufficient static stability, but more importantly gives sufficient room for it to house the gear wheels 356 and the stiffening member 328. Choices of materials for the different parts of the support part, picking heads and actuators may, however, alter their strength and stiffness as well as the total weight and weight distribution of the picking row, thus leading to a different optimal configuration.

Finally, the size and design of the picking heads 105, 205, 305 will also have to be taken into consideration when determining the optimal mutual positioning of the picking rows, particularly to avoid collision between picking heads on neighbouring rows during operation. This and the other factors described above, which have to be regarded in relation to the positioning of the picking rows in the apparatus according to the invention, are factors which are already today being considered by the skilled person as a part of the normal running of prior art defeathering apparatuses. The use of the picking rows according to the present invention will put increased emphasis on some of these factors, but the adaptation to optimizing the operation under these new conditions will not lay an undue burden on the skilled person.

The invention should not be regarded as being limited to the embodiments shown. On the contrary, various modifications and combinations of the features shown will be within the scope of the invention.

The invention claimed is:

1. A picking row for use in a poultry defeathering apparatus, said picking row comprising:
   an elongate support part with a front side surface, a back side surface facing away from the front side surface, a first interconnecting side surface, a second interconnecting side surface and two ends, said side surfaces extending in parallel to a length axis of the support part and said first and second interconnecting side surfaces interconnecting the front and back side surfaces,
   a plurality of picking heads arranged on the front side surface of the support part, each comprising a disc shaped base member with a plurality of picking fingers attached thereto, and
   at least one actuator for rotating each of the picking heads about an axis, which is substantially perpendicular to the length axis of the support part,
   where the support part has a height defined as the longest distance between the interconnecting surfaces measured perpendicularly to the length axis and to the axes of rotation of the picking heads and a width defined as the longest distance between the front and back side surfaces measured in parallel to the axes of rotation of the picking heads,
   where each end is configured for being interconnected to a frame in a manner so that the picking row is pivotable about an axis, which is parallel to the length axis, and
   where at least one of the interconnecting side surfaces is convex and configured for facing another picking row.

2. A picking row according to claim 1, where the front and back side surfaces are parallel to each other and perpendicular to the axes of rotation of the picking heads, and where the interconnecting surfaces are both curved with a radius of curvature corresponding to half the height of the support part.

3. A picking row according to claim 2, where the width of the support part is equal to or larger than the radius of curvature of the interconnecting surfaces.

4. A picking row according to claim 1, where the height of the support part is 100-300 mm.

5. A picking row according to claim 1, where the base members of the picking heads have a diameter of 100-300 mm.

6. A picking row according to claim 1, further comprising mounting pins or holes at its ends at its cross-sectional centroid or centre of gravity.

7. A picking row according to claim 1, where at least one of the interconnecting side surfaces is made from a non-metallic material, preferably chosen from the group consisting of: plastic, such as nylon, ceramics and any composites and mixtures thereof.

8. A picking row according to claim 1, where the convex shape of the interconnecting side surface is formed by an attachment member attached directly or indirectly to a base member of the support part either permanently or detachably.

9. A poultry defeathering apparatus comprising two or more picking rows at least one of which according to claim 1, said picking rows being arranged side-by-side such that their respective length axes are substantially parallel to each other and at a distance from each other and with the picking heads facing in substantially the same direction, so that interconnecting side surfaces of neighbouring picking rows face each other thereby forming a pair of interconnecting side surfaces, where at least one of the interconnecting side surfaces forming a pair is convex.

10. A poultry defeathering apparatus according to claim 9, where both interconnecting side surfaces forming a pair are convex.

11. A poultry defeathering apparatus according to claim 9, where each of the picking rows is mounted to be pivotable about an axis, which is parallel to its length axis and intersecting the cross-sectional centroid or centre of gravity of the support part.

12. A poultry defeathering apparatus according to claim 9, where at least one of the interconnecting side surfaces of a pair is made from a non-metallic material.

13. A poultry defeathering apparatus according to claim 9, where the two or more picking rows are identical.

14. A poultry defeathering apparatus according to claim 9, where two or more picking rows are arranged end-to-end.

15. A poultry defeathering apparatus according to claim 9, where two or more picking rows are arranged opposite each other with the picking heads of each picking row facing the other.

16. A poultry defeathering apparatus according to claim 9, where each picking row is equipped with its own driving mechanism, preferably an electric motor.

17. A poultry defeathering apparatus according to claim 9, where the driving mechanism is mounted at a picking head, the axis of rotation of which forms the first or second point of intersection counted from the centre of the picking row along its length axis.

18. A picking row according to claim 1, where the height of the support part is 250-150 mm.

19. A picking row according to claim 1, where the base members of the picking heads have a diameter of 110-180 mm.

* * * * *